US007395868B2

(12) United States Patent
Sundholm et al.

(10) Patent No.: US 7,395,868 B2
(45) Date of Patent: Jul. 8, 2008

(54) APPARATUS FOR BLOCKING A MEDIUM FLOW PASSAGE IN A SPRAY HEAD, AND SPRAY HEAD

(75) Inventors: Goran Sundholm, Tuusula (FI); Harry Metzger, Kerava (FI)

(73) Assignee: Marioff Corporation Oy, Vantaa (FI)

( * ) Notice: Subject to any disclaimer, the term of this patent is extended or adjusted under 35 U.S.C. 154(b) by 169 days.

(21) Appl. No.: 10/552,636

(22) PCT Filed: Apr. 21, 2004

(86) PCT No.: PCT/FI2004/000244

§ 371 (c)(1),
(2), (4) Date: Oct. 7, 2005

(87) PCT Pub. No.: WO2004/094000

PCT Pub. Date: Nov. 4, 2004

(65) Prior Publication Data

US 2006/0237199 A1 Oct. 26, 2006

(30) Foreign Application Priority Data

Apr. 24, 2003 (FI) .................................. 20030620

(51) Int. Cl.

*A62C 37/08* (2006.01)
*A62C 37/12* (2006.01)
*A62C 37/14* (2006.01)
*F16K 17/14* (2006.01)
*F16K 17/40* (2006.01)

(52) U.S. Cl. ............................. 169/37; 169/20; 169/57; 169/58; 137/68.19; 137/68.22

(58) Field of Classification Search ................... 169/37, 169/20, 57, 38, 41, 42, 56–58; 137/68.19, 137/68.22, 67, 68.11, 68.12, 72
See application file for complete search history.

(56) References Cited

U.S. PATENT DOCUMENTS

| | | | | |
|---|---|---|---|---|
| 1,836,528 | A * | 12/1931 | Dyson | 169/37 |
| 3,647,109 | A | 3/1972 | Hebblewaite | |
| 3,834,463 | A * | 9/1974 | Allard et al. | 169/28 |
| 4,896,728 | A * | 1/1990 | Wolff et al. | 169/37 |
| 5,639,029 | A | 6/1997 | Sundholm | |
| 5,967,239 | A | 10/1999 | Sprakel et al. | |
| 6,318,474 | B1 * | 11/2001 | Sundholm | 169/37 |
| 6,732,808 | B1 * | 5/2004 | Sprakel | 169/17 |

(Continued)

FOREIGN PATENT DOCUMENTS

DE 2 003 591 9/1970

(Continued)

*Primary Examiner*—Darren W Gorman
(74) *Attorney, Agent, or Firm*—Ladas and Parry LLP

(57) ABSTRACT

An apparatus for blocking a medium flow passage in a spray head has a blocking element in the passage that, when unbroken, blocks the passage of medium from a first side having a first pressure to a second side having a second pressure. A supporting element is on that side of the blocking element where the pressure is lower, the supporting element being movable between a first position where the supporting element supports the blocking element so that it cannot be ruptured and a second position where the supporting element does not so support the blocking element.

4 Claims, 1 Drawing Sheet

U.S. PATENT DOCUMENTS 7,032,681 B1 * 4/2006 Sprakel ....................... 169/58

FOREIGN PATENT DOCUMENTS

| | | |
|---|---|---|
| DE | 33 22 543 | 3/1984 |
| DE | 34 44 486 | 6/1986 |
| DE | 199 48 324 | 4/2001 |
| WO | 03/089065 | 10/2003 |

* cited by examiner

APPARATUS FOR BLOCKING A MEDIUM FLOW PASSAGE IN A SPRAY HEAD, AND SPRAY HEAD

BACKGROUND OF THE INVENTION

The present invention relates to an apparatus for blocking a medium flow passage in a spray head. The apparatus comprises a blocking element, such as a burst disk, arranged in the passage. When unbroken, the blocking element blocks the passage of medium flow from a first side of the blocking element to a second side of the blocking element. On the first side of the blocking element a first pressure prevails in the passage, while on the second side of the blocking element a second pressure prevails in the passage. The blocking element has been arranged to be ruptured so as to form a passage for the medium through the blocking element when the pressure difference between the first and the second sides of the blocking element reaches a preset value.

In fire extinguishing technology, solutions are also known in which the flow passage of an extinguishing medium is provided with an element rupturable by the prevailing pressure (burst disk, rupture disk), placed between a liquid source and a spraying nozzle to block the passage. These are ruptured when the pressure difference in the passage on different sides of the burst disk exceeds a given value, which is characteristic to each burst disk. A solution of this type is described e.g. in the publication Fire Protection Handbook, 18th Edition, 1997, pages 6-200. Specification DE 19948324 discloses a corresponding solution. In prior-art solutions, the burst disk is so designed that it is bound to be ruptured when the pressure difference increases sufficiently. Therefore, incidental pressure variations occurring in the piping e.g. due to a malfunction may cause a rupture of the burst disk, which again results in significant extra costs. If the burst disk is so designed that it will not be ruptured until the pressure difference has reached a very high value, this may jeopardize reliable operation of the system in a fire situation. Solutions have therefore been developed in which the burst disk is ruptured by using separate devices to pierce the burst disk. These have not always been satisfactory in operation or they have been complicated and required energy from outside in order to work.

On the other hand, prior-art devices known in fire extinguishing technology include sprinkler heads provided with a valve element which in a non-activated state blocks the liquid flow passage and, when the sprinkler is activated upon being triggered, e.g. when a heat activated ampoule is broken, moves into a position where the extinguishing medium can flow into one or more nozzles. These solutions use dynamic seals, such as 0-rings, to seal the space between the valve element and the flow passage wall In the non-activated state. A sprinkler head of this type, which uses ring-like seals, is disclosed in U.S. Pat. No. 5,967,239 (Sprakel, et al.). In recent times there has appeared a need to avoid the use of dynamic seals in spray heads used for fire extinguishing purposes. In addition, the clearances between the valve element or shaft and the sprinkler body typically have to be made very small.

The object of the present invention is to achieve a completely new type of solution in conjunction with blocking elements to ensure their reliable operation. On the other hand, a second object is to achieve a compact solution in conjunction with spray heads to avoid the use of dynamic seals.

BRIEF DESCRIPTION OF THE INVENTION

The apparatus of the invention is characterized in that it comprises a supporting element arranged at least on that side of the blocking element where the pressure of the medium is lower at least just before the instant of rupture of the blocking element, which supporting element can be moved between at least two positions, a first position where the supporting element supports the blocking element so that the blocking element cannot be broken even if the pressure difference in the passage between the first and the second sides of the blocking element is greater than the preset value, and a second position where the supporting element does not support the blocking element.

The solution of the invention has numerous significant advantages. By providing an element supporting the blocking element, reliable rupture of the blocking element in a desired situation is achieved. By using a lockable supporting element arrangement, a reliable solution is achieved in which the supporting element is preserved in an unbroken state in desired situations. By providing a releasing element in conjunction with the supporting element, it is possible to accomplish a desired movement of the supporting element to the second position. By using a temperature-dependent releasing element, an excellent solution for use in fire extinguishing systems is achieved. By using the blocking system of the invention in conjunction with a spray head, an excellent solution for use in fire extinguishing systems is achieved, obviating the need for dynamic seals. In addition, the need to have small clearances between the shaft and the sprinkler head is eliminated, thus providing technical advantages in manufacture. At the same time, a very compact structure that does not take up much space and is very reliable in operation is achieved. By providing the sprinkler head with a regulating element, the supporting force can be adjusted as desired and, on the other hand, heat sensitive elements, i.e. triggering elements, such as ampoules, of different dimensions can be used in the sprinkler.

BRIEF DESCRIPTION OF THE FIGURES

In the following, the invention will be described in detail with reference to an example and the attached drawings, wherein.

DETAILED DESCRIPTION OF THE INVENTION

Figure 1:
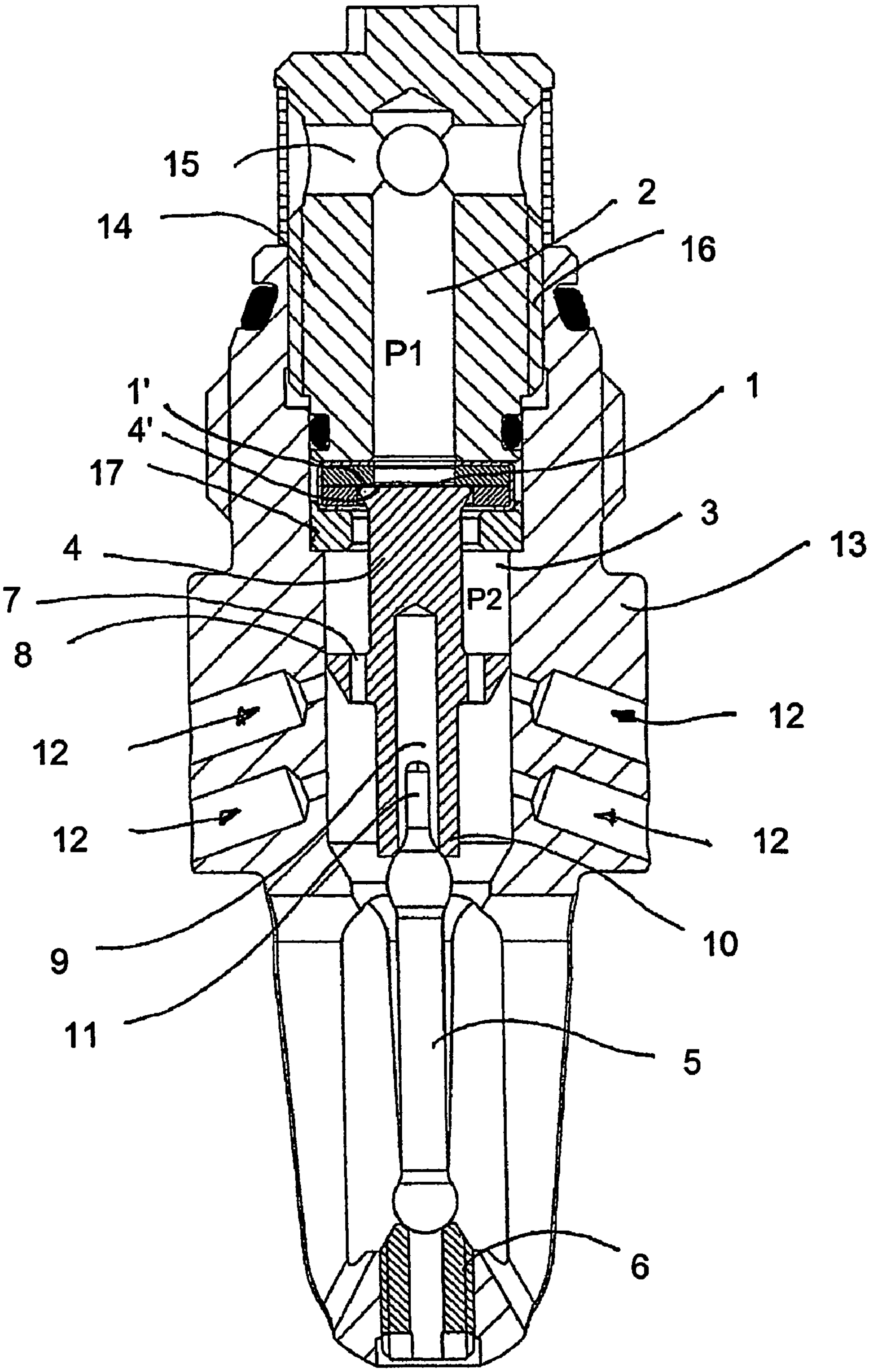
FIG. 1 presents an apparatus according to the invention in conjunction with a spray head.

FIG. 1 presents an arrangement according to the invention in a simplified form. The solution comprises a medium passage 2, 3 in a spray head in which typically a first pressure p1 prevails when the spray head is in a state of readiness. The medium passage is provided with a blocking element 1, preferably a burst disk (rupture disk) or equivalent, which in an unbroken state blocks the passage 2, 3. Arranged in the passage is a supporting element 4, which in the figure is placed on the opposite side 3 of the blocking element 1 relative to first pressure p1 of passage 2. The blocking element 1 and the supporting element 4 acting on it and a possible second pressure p2 together withstand the pressure p1 of the medium. When the supporting element 4 is released from its position supporting the blocking element, the blocking element 1 is broken, allowing the medium to flow in the medium passage to the second side of the blocking element.

The blocking element is for example so designed that, without the supporting effect of the supporting device, it is bound to be ruptured by the action of the first pressure p1. In an embodiment, the first pressure p1 is typically 4-25 bar.

In an embodiment, the supporting element of the supporting device is e.g. a piston whose frontal surface in the position of readiness lies against the blocking element surface opposite the pressure. When the supporting device is activated and released from the supporting position, the piston will move away from its position supporting the blocking element, with the result that the blocking element is ruptured by the action of the first pressure.

In the embodiment illustrated in the figure, the solution of the invention is applied in conjunction with a spray head, especially a sprinkler head used in firefighting. It is provided with a triggering device, e.g. an ampoule that is ruptured at a given temperature and in the ruptured state releases the supporting element of the supporting device from its supporting position to a second position, in which the supporting element does not support the blocking element surface intended to be ruptured.

The apparatus for blocking a medium flow passage in a spray head comprises a blocking element 1 arranged in the passage, such as a burst disk, which in an unbroken state blocks the passage of medium flow from a first side of a blocking element to a second side of the blocking element. On the first side of the blocking element, a first pressure (p1) prevails in passage 2, while on the second side a second pressure (p2) prevails in passage 3. The blocking element 1 has been fitted to be ruptured when the pressure difference between the first and the second sides of the blocking element reaches a preset value, a medium flow passage being thus formed through the blocking element. A supporting element 4 is provided at least on that side of the blocking element where the medium pressure is lower at least just before the instant of rupture of the blocking element. The supporting element 4 can be moved between at least two positions, a first position, in which the supporting element supports the blocking element so that the blocking element cannot be ruptured even if the pressure difference in the passage between the first and the second sides of the blocking element is higher than the preset value, and a second position, in which the supporting element does not support the blocking element.

The apparatus comprises means 5, 6 for locking the supporting element 4 in the first position. The apparatus comprises means 5 for releasing the supporting element 4 from the first position. In the embodiment illustrated in the figure, the means for locking and/or releasing the supporting element comprise a heat sensitive element 5. The heat sensitive element 5 may be e.g. an ampoule known In itself in firefighting, which breaks or melts at a given temperature. In the embodiment illustrated in the figure, the supporting element 4 is a piston element. The piston element 4 may be provided with one or more apertures 7 or channel parts designed to permit easier flow of the medium after the blocking element 1 has been ruptured. In the embodiment shown in the figure, the supporting element is provided with a shoulder 8 to cause the supporting element to be more effectively moved from the first position to the second position.

In an embodiment, the apparatus is fitted in a flow passage for a fire extinguishing medium in a fire extinguishing system. The apparatus is also particularly well applicable for use in systems using an aqueous liquid mist as an extinguishing medium.

The apparatus of the invention can be arranged for use in conjunction with a spray head, especially a sprinkler head.

In FIG. 1, the body 13 of the spray head is provided with a bore 3 which also functions as medium flow passage. From the bore a passage is further provided for at least one nozzle 12. Formed in the body are screw threads 16 in which a sleeve 14 provided with bores 2, 15 can be secured. The bores 15, 2 serve as a medium flow passage into the spray head. Arranged in the bore 3 in the body is a shoulder 17, which again bears a blocking element 1, especially a burst disk or the like. The blocking element is preferably pressed in the bore between the sleeve and the shoulder, so that when unbroken, it blocks the passage from the bore 2 in the sleeve into the bore 3 in the spray head body. Arranged in the bore 3 in the body is a supporting element 4, which in a first position supports the blocking surface of the supporting element 4. In the case illustrated in the figure, the supporting element is locked in the first position to support the blocking element by means of a locking device 5, 6. The supporting element consists of a supporting part 6 formed in the body, said part supporting means 5 for releasing the supporting element 4 from the first position. In the embodiment illustrated in the figure, the means for locking and/or releasing the supporting element comprise a heat sensitive element 5. The heat sensitive element 5 may be e.g. an ampoule known in itself in firefighting and designed to be ruptured at a given temperature. Similarly, the heat sensitive element 5 may melt at a given temperature. Naturally, other types of devices for releasing the supporting element may be used, so it is conceivable that they could work e.g. on the basis of a signal issued by the control system of a fire extinguishing system. Formed in the lower end 10 of the supporting element 4 is a bore 9 where the upper end 11 of the ampoule as seen in the figure has been arranged to fit in. The total length of the ampoule 5 and the supporting element 4 has been adjusted to be such that when the ampoule is In position, the supporting element is locked to support the blocking element 1 surface designed to be ruptured The supporting part 6 has preferably been arranged to be adjustable, e.g. by means of screw treads formed in the body 13 and corresponding counter-threads formed in the supporting part 6. This allows, among other things, to adjust the supporting force applied to the blocking element 1 to a suitable level or likewise to fit different heat sensitive elements 5 of varying dimensions, especially length, in the spray head. This also facilitates the installation work.

In the embodiment illustrated in the figure, the passage is somewhat wider in diameter on the side 3 of the supporting element 4 than on the side 2 beyond the supporting element, the blocking element having a counter-surface 1' for the supporting surface 4' of the supporting element, typically for its edges. The counter-surface 1' is typically a ring-like surface encircling the surface designed to be ruptured.

The general operation of the spray head of the invention will not be described in detail in this context, but its is assumed to be obvious to a person skilled in the art. In this connection, reference is made to U.S. Pat. No. 6,318,474.

It is obvious to the person skilled in the art that the invention is not limited to the embodiments described above, but that it may be varied within the scope of the claims presented below.

The invention claimed is:

1. In apparatus of a spray head for blocking a medium flow passage in the spray head, the improvements comprising:

a blocking element (1) arranged in the passage and, when unbroken, blocking the passage of medium flow from a first side of the blocking element to a second side of the blocking element, on the first side of which blocking element a first pressure(p1) prevails in the medium flow passage (2) while on the second side a second pressure (p2) prevails in a passage (3), said blocking element (1) being arranged to be ruptured so that another medium flow passage is formed through the blocking element by a pressure difference between the first and the second sides of the blocking element of a preset value; and a supporting element (4) at least on the second side of the blocking element where the pressure of the medium is lower at least just before the instant of rupture of the blocking element, which supporting element can be moved between a first position where the supporting element supports the blocking element (1) so that the blocking element cannot be ruptured even if the pressure difference in the passage between the first and the second sides of the blocking element is greater than the preset value, and a second position where the supporting element does not support the blocking element, characterized in that the apparatus comprises means for applying and adjusting a supporting force to the blocking element.

2. Apparatus according to claim 1, characterized in that the means for applying and adjusting the supporting force comprise a supporting part (6) that has been arranged to be adjustable by means of screw threads (13) formed in a body of the spray head and corresponding counter-threads formed in the supporting part (6).

3. In apparatus of a spray head for blocking a medium flow passage in the spray head, the improvements comprising:

a blocking element (1) arranged in the passage and, when unbroken, blocking the passage of medium flow from a first side of the blocking element to a second side of the blocking element, on the first side of which blocking element a first pressure(p1) prevails in the medium flow passage (2) while on the second side a second pressure (p2) prevails in a passage (3), said blocking element (1) being arranged to be ruptured so that another medium flow passage is formed through the blocking element by a pressure difference between the first and the second sides of the blocking element of a preset value; and a supporting element (4) at least on the second side of the blocking element where the pressure of the medium is lower at least just before the instant of rupture of the blocking element, which supporting element can be moved between a first position where the supporting element supports the blocking element (1) so that the blocking element cannot be ruptured even if the pressure difference in the passage between the first and the second sides of the blocking element is greater than the preset value, and a second position where the supporting element does not support the blocking element, characterized in that the apparatus has adjustable means for fitting a heat sensitive element (5) between the spray head and the supporting element (4).

4. Apparatus according to claim 3, characterized in that the adjustable means comprise a supporting part (6) arranged to be adjustable by means of screw threads (13) formed in a body of spray head and corresponding counter-threads formed in the supporting part (6).

* * * * *